United States Patent
Kim et al.

(10) Patent No.: US 10,317,732 B2
(45) Date of Patent: Jun. 11, 2019

(54) DISPLAY APPARATUS WITH BACKLIGHT UNIT

(71) Applicant: SAMSUNG ELECTRONICS CO., LTD., Suwon-si (KR)

(72) Inventors: Dae Young Kim, Hwaseong-si (KR); Jong Bin Kim, Suwon-si (KR); Hyung Ki Kim, Anyang-si (KR); Young Min Lee, Bucheon-si (KR); Young-Wook Jung, Suwon-si (KR); Jae Hak Cho, Hwaseong-si (KR); Yong Dok Cha, Suwon-si (KR)

(73) Assignee: SAMSUNG ELECTRONICS CO., LTD., Suwon-si (KR)

(\*) Notice: Subject to any disclaimer, the term of this patent is extended or adjusted under 35 U.S.C. 154(b) by 151 days.

(21) Appl. No.: 15/342,672

(22) Filed: Nov. 3, 2016

(65) Prior Publication Data
US 2017/0184920 A1   Jun. 29, 2017

Related U.S. Application Data

(60) Provisional application No. 62/387,140, filed on Dec. 23, 2015.

(30) Foreign Application Priority Data

Feb. 5, 2016   (KR) .................. 10-2016-0015043

(51) Int. Cl.
| | | |
|---|---|---|
| *G02F 1/1335* | (2006.01) | |
| *F21V 3/00* | (2015.01) | |
| *F21V 7/00* | (2006.01) | |
| *F21V 7/06* | (2006.01) | |

(Continued)

(52) U.S. Cl.
CPC .......... *G02F 1/133615* (2013.01); *F21V 3/00* (2013.01); *F21V 7/0008* (2013.01);
(Continued)

(58) Field of Classification Search
CPC . F21V 3/00; F21V 7/0008; F21V 7/06; G02B 6/0096; G02B 6/0066;
(Continued)

(56) References Cited

U.S. PATENT DOCUMENTS 8,556,444 B2 \* 10/2013 Kim .................. G02F 1/133603
349/62
2006/0290620 A1   12/2006 Chou et al.
(Continued)

FOREIGN PATENT DOCUMENTS

KR   10-2007-0063642 A   6/2007
KR   10-2009-0073965 A   7/2009
(Continued)

OTHER PUBLICATIONS

Communication dated Jan. 5, 2017, issued by the European Patent Office in counterpart European Application No. 16198864.7.
(Continued)

*Primary Examiner* — Anabel Ton
(74) *Attorney, Agent, or Firm* — Sughrue Mion, PLLC

(57) ABSTRACT

A display apparatus includes a plurality of light sources that are arranged in several rows at different intervals so that light emitted from the plurality of light sources may reach all regions of a display panel uniformly. Accordingly, a uniform dispersion of the light incident on the display panel may be achieved. Furthermore, distribution of light generated from the plurality of light sources on the display panel may be facilitated through a reflecting unit without the use of a light-guide plate or the like.

18 Claims, 12 Drawing Sheets

(51) Int. Cl.
  *G02F 1/1333* (2006.01)
  *F21V 8/00* (2006.01)
  *F21Y 105/12* (2016.01)
  *F21Y 115/10* (2016.01)
(52) U.S. Cl.
  CPC .............. *F21V 7/06* (2013.01); *G02B 6/0096* (2013.01); *G02F 1/133308* (2013.01); *G02F 1/133605* (2013.01); *F21Y 2105/12* (2016.08); *F21Y 2115/10* (2016.08); *G02B 6/0066* (2013.01); *G02B 6/0088* (2013.01); *G02F 1/133603* (2013.01); *G02F 2001/13332* (2013.01); *G02F 2001/133314* (2013.01)
(58) Field of Classification Search
  CPC .............. G02B 6/0088; G02F 1/33308; G02F 1/133603; G02F 2001/133314
  See application file for complete search history.

(56) References Cited

U.S. PATENT DOCUMENTS

| | | |
|---|---|---|
| 2012/0033420 A1 | 2/2012 | Kim et al. |
| 2012/0134136 A1 | 5/2012 | Seo et al. |
| 2012/0188486 A1 | 7/2012 | Baba et al. |
| 2013/0155676 A1 | 6/2013 | Lee |
| 2013/0242541 A1* | 9/2013 | Kim .................... F21V 7/00 362/97.1 |
| 2014/0146522 A1 | 5/2014 | Song et al. |
| 2015/0103288 A1 | 4/2015 | Lee et al. |

FOREIGN PATENT DOCUMENTS

| | | |
|---|---|---|
| KR | 10-2013-0030809 A | 3/2013 |
| KR | 10-2015-0031694 A | 3/2015 |
| KR | 1020150044224 A | 4/2015 |

OTHER PUBLICATIONS

International Search Report dated Feb. 15, 2017, issued by the International Searching Authority in counterpart International Application No. PCT/KR2016/012742 (PCT/ISA/210).

Communication dated Aug. 9, 2018 issued by the European Patent Office in counterpart European Application No. 16 198 864.7.

\* cited by examiner

DISPLAY APPARATUS WITH BACKLIGHT UNIT

CROSS-REFERENCE TO RELATED APPLICATION

This application claims priority from U.S. Provisional Application No. 62/387,140, filed on Dec. 23, 2015 in the U.S. Patent and Trademark Office, and Korean Patent Application No. 10-2016-0015043, filed on Feb. 5, 2016 in the Korean Intellectual Property Office, the disclosures of which are incorporated herein by reference.

BACKGROUND

1. Field

Apparatuses and methods consistent with exemplary embodiments relate to a display apparatus with an improved backlight unit.

2. Description of the Related Art

Generally, a display apparatus is an apparatus which displays an image. Examples of a display apparatus include a monitor, a television, etc. Display apparatuses may include a self-emitting display panel such as an organic light-emitting diode (OLED) display and a light-receiving display panel such as a liquid crystal display (LCD).

A light-receiving display panel may include a liquid crystal panel configured to display an image and a backlight unit behind the display panel.

The backlight unit is located behind the display panel and includes a light-emitting diode (LED) module, which is a light source. Light generated from the light source is emitted to the display panel. When the light source is located at a side of the display panel, it is difficult to emit light uniformly to all regions of the display panel, and thus an overall difference in brightness may occur throughout the entire screen.

SUMMARY

One or more exemplary embodiments provide a display apparatus in which light sources are non-uniformly arranged so that light may be sufficiently emitted to all regions of a display panel.

One or more exemplary embodiments also provide a display apparatus having an auxiliary member to smoothly emit light from a light source to a reflecting unit, so that the light may be emitted to a display panel via the reflecting unit.

In accordance with an aspect of an exemplary embodiment, there is provided a display apparatus including a display panel, a front chassis provided in front of the display panel, a printed circuit board disposed behind the display panel and including a plurality of light sources arranged on the printed circuit board in a zigzag pattern, a rear chassis disposed behind the display panel and including a first reflecting unit to reflect light emitted from the plurality of light sources, and a second reflecting unit disposed between the plurality of light sources and the first reflecting unit and configured to reflect at least some of the light emitted from the plurality of light sources to the first reflecting unit.

The printed circuit board may be tilted toward the second reflecting unit such that the plurality of light sources may face the second reflecting unit.

The plurality of light sources may be arranged in a first region and a second region of the printed circuit board. The first region may be located at an end of the printed circuit board and the second region may be located at a center of the printed circuit board. A distance between the plurality of light sources in the first region may be different from a distance between the plurality of light sources in the second region.

The distance between the plurality of light sources in the first region may be greater than the distance between the plurality of light sources in the second region.

A distance between the plurality of light sources may gradually decrease from the first region to the second region.

The plurality of light sources may be arranged in two rows in a lengthwise direction of the printed circuit board.

The plurality of light sources may be arranged at an offset between the two rows so as not to overlap with one another in the lengthwise direction of the printed circuit board.

The printed circuit board may include an installation surface on which the plurality of light sources are installed.

The installation surface may be disposed facing the rear chassis such that the plurality of light sources face the rear chassis.

The installation surface may be tilted at an angle of about 30 degrees with respect to the display panel.

The second reflecting unit may include a reflecting surface including a parabolic curved surface.

The reflecting surface may be concave toward the plurality of light sources.

The printed circuit board may be coupled to the rear chassis.

In accordance with another aspect of an exemplary embodiment, a display apparatus may include a display panel, a front chassis provided in front of the display panel, an optical sheet disposed behind the display panel, a diffusion plate disposed behind the optical sheet, a printed circuit board on which a plurality of light sources configured to emit light to the display panel are installed. The printed circuit board may include a long side and a short side. The display apparatus may further include a rear chassis disposed behind the diffusion plate and spaced apart from the diffusion plate to support the printed circuit board.

A distance between any two light sources of the plurality of light sources arranged in a direction in which the long side extends may gradually decrease toward a center of the printed circuit board. At least some of the plurality of light sources may be arranged to overlap with one another in a direction in which the short side extends.

At least some of the light emitted from the plurality of light sources may be reflected from the rear chassis to the diffusion plate.

The rear chassis may include a first reflecting unit to reflect the emitted light to the diffusion plate.

The first reflecting unit may include a curved surface which is concave toward the diffusion plate.

The display apparatus may further include a second reflecting unit disposed between the plurality of light sources and the rear chassis. The second reflecting unit may be configured to reflect at least some of the light emitted from the plurality of light sources to the first reflecting unit.

The second reflecting unit may reflect the light emitted from the plurality of light sources in one direction.

The second reflecting unit may have a reflecting surface having a parabolic curved shape.

In accordance with an aspect of another exemplary embodiment, there is provided a display apparatus including a display panel, a front chassis provided in front of the display panel, a printed circuit board disposed behind the display panel and including a plurality of light sources arranged in two rows in a zigzag pattern in a direction perpendicular to a lengthwise direction of the printed circuit board, a rear chassis disposed behind the diffusion plate, and including a first reflecting unit to reflect light emitted from the plurality of light sources, and a second reflecting unit disposed between the plurality of light sources and the first reflecting unit and configured to reflect at least some of the light emitted from the plurality of light sources to the first reflecting unit.

A distance between the plurality of light sources may be different at an end portion of the printed circuit board and at a center portion of the printed circuit board.

The display apparatus may further include an optical sheet disposed behind the display panel and a diffusion plate disposed between the optical sheet and the rear chassis, and at least some of the light emitted from the plurality of light sources may be refracted by the second reflecting unit and reflected by the first reflecting unit to reach the diffusion plate.

BRIEF DESCRIPTION OF THE DRAWINGS

The above and/or other aspects will become apparent and more readily appreciated from the following description of embodiments, taken in conjunction with the accompanying drawings of which.

DETAILED DESCRIPTION

Figure 1:
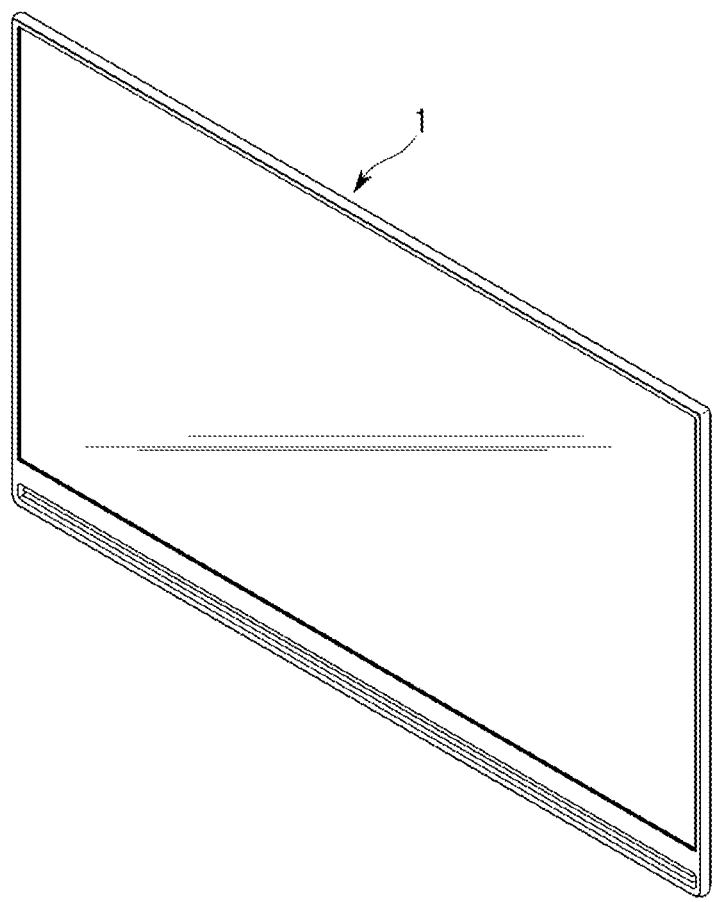
FIG. 1 is a perspective view of a display apparatus in accordance with an exemplary embodiment.

Embodiments described in the present disclosure and illustrated in the drawings are merely examples of the present disclosure.

In the drawings, like reference numerals or signs denote components or elements configured to perform substantially the same functions.

The terminology used herein is for the purpose of describing particular embodiments only and is not intended to be limiting of the present disclosure. As used herein, the singular forms 'a', 'an' and 'the' are intended to include the plural forms as well, unless the context clearly indicates otherwise. It should be further understood that the terms 'comprise' and/or 'comprising,' when used in this specification, specify the presence of stated features, integers, steps, operations, elements, components, or a combination thereof but do not preclude the presence or addition of one or more other features, integers, steps, operations, elements, components, or a combination thereof. Further, the word "exemplary" is used herein to mean "serving as an example or illustration." Any aspect or design described herein as "exemplary" is not necessarily to be construed as preferred or advantageous over other aspects or designs.

It should be understood that, although the terms 'first', 'second', 'third', etc., may be used herein to describe various elements, components, regions, layers and/or sections, these elements, components, regions, layers and/or sections are not limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure. Similarly, a second element, component, region, layer or section discussed below could be termed a first element, component, region, layer or section without departing from the teachings of the present disclosure. The term 'and/or' includes any and all combinations of one or more of the associated listed items.

When it is disclosed that one element (e.g. a first element) is coupled, or connected, to another element (e.g. a second element), it should be understood to include to the extent that each of the elements are directly connected to one another, or indirectly coupled through still another element (e.g. a third element). On the contrary, when it is disclosed that an element (e.g. the first element) is "directly coupled," or "directly connected" to another element (e.g. the second element), it may signify that still another element (for example, the third element) exists between the element and the another element.

Hereinafter, embodiments of the present disclosure will be described in detail with reference to the accompanying drawings.

In the present disclosure, the terms 'front side' and 'the front' should be understood to indicate the front or a direction of the front of a display apparatus 1 of FIG. 1, and the term 'rear' should be understood to indicate a direction of the rear of the display apparatus 1.

In the present disclosure, the display apparatus 1, which is a flat display, is described as an example. However, the present disclosure is applicable to a curved display apparatus or a bendable/flexible display apparatus capable of switching between a curved state and a flat-panel state.

In addition, the present disclosure is applicable to the display apparatus 1 regardless of the screen size thereof. As an example, the present disclosure is applicable to either a product that may be installed on a table, a wall, or ceiling (e.g., a smart television, a monitor, etc.) or a portable product (e.g., a tablet computer, a notebook computer, a smart phone, an e-book reader, etc.).

A plurality of light sources may be included in a backlight unit described below. Although the plurality of light sources may be referred to simply as a light source for convenience of explanation, it should be understood that the plurality of light sources may be arranged on a printed circuit board in accordance with an aspect of an exemplary embodiment.

Figure 2:
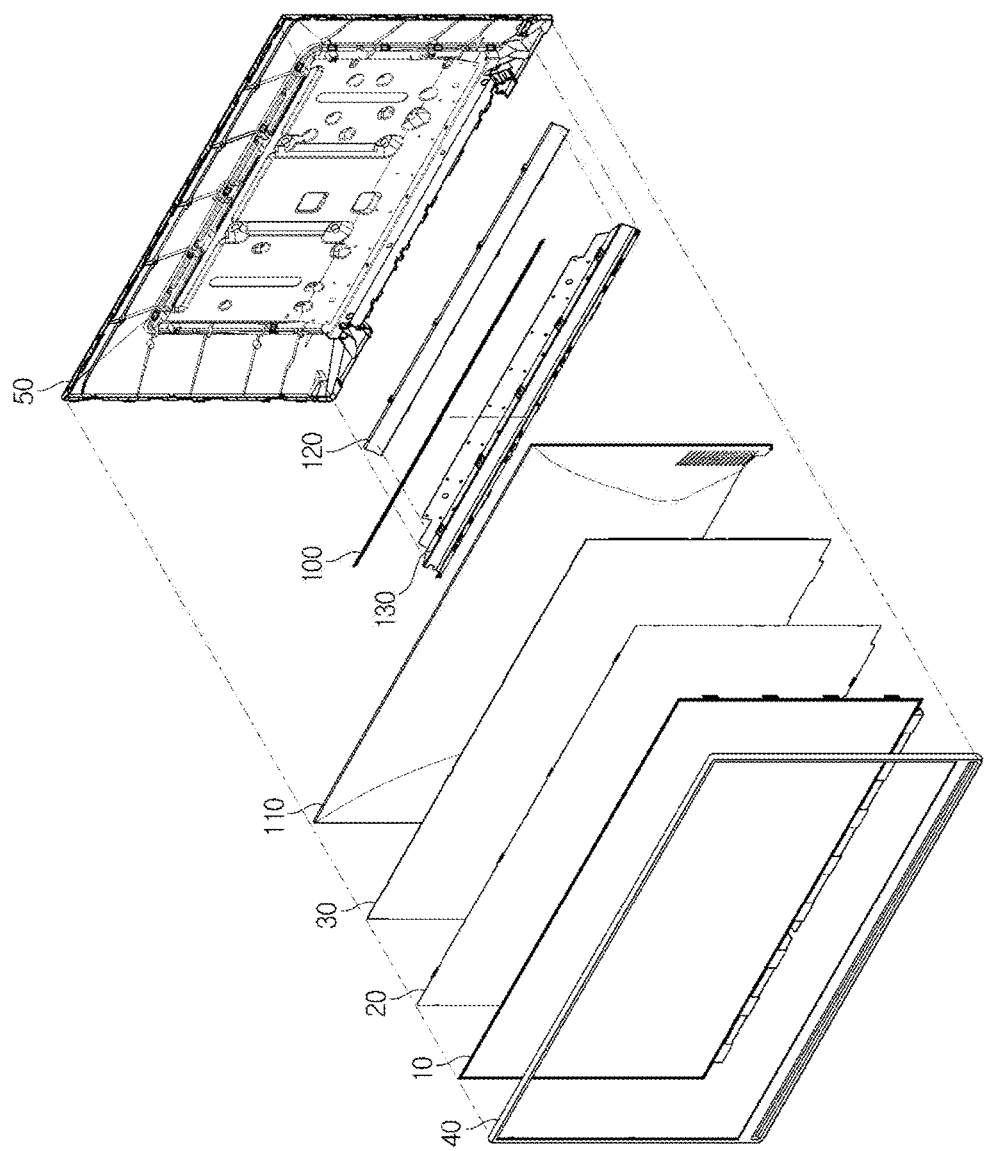
FIG. 2 is an exploded perspective view of a display apparatus in accordance with an exemplary embodiment.

FIG. 1 is a perspective view of a display apparatus in accordance with an exemplary embodiment. FIG. 2 is an exploded perspective view of a display apparatus in accordance with an exemplary embodiment.

The display apparatus 1 may include a display panel 10 configured to display an image, a diffusion plate 30 located behind the display panel 10 to diffuse light transmitted from the rear of the display apparatus 1 to the display panel 10 at the front of the display apparatus 1, an optical sheet 20 located between the display panel 10 and the diffusion plate 30 to improve optical characteristics of the light diffused by the diffusion plate 30, a front chassis 40 coupled to the front of the display panel 10, and a rear chassis 50 coupled to the rear of the front chassis 40 to house and support the display panel 10. The display apparatus 1 may further include a middle mold combined between the front chassis 40 and the rear chassis 50 to support the display panel 10.

The display panel 10 may be a liquid crystal panel formed by filling liquid crystal between two glass substrates having electrodes thereon.

The optical sheet 20 may include a diffusion sheet which diffuses light transmitted via the diffusion plate 30, a prism sheet which condenses diffused light in a direction perpendicular to the display panel 10, a protection sheet which protects the prism sheet, and the like.

The front chassis 40 may be located on a front surface of the display panel 10 and combined with the rear chassis 50 behind the display panel 10. The display panel 10, the optical sheet 20, and the diffusion plate 30 may be located between the front chassis 40 and the rear chassis 50 to be supported by the rear chassis 50 in a space formed by combining the front chassis 40 and the rear chassis 50 with each other. The display panel 10 and the like may be supported by the middle mold between the front chassis 40 and the rear chassis 50. The front and rear of the middle mold may be supported by the front chassis 40 and the rear chassis 50.

In accordance with an exemplary embodiment, the front chassis 40 may form a front exterior of the display apparatus 1 without an additional cover unit. However, the present disclosure is not limited thereto and a front cover configured to cover the front chassis 40 may be additionally provided to form the front exterior of the display apparatus 1.

The rear chassis 50 may be located behind the display panel 10 and support the display panel 10 as described above. As will be described below, the rear chassis 50 may further support a printed circuit board 100 including light sources thereon, a first reflecting unit 110, and a second reflecting unit 120.

A rear cover forming a rear exterior of the display apparatus 1 may be provided behind the rear chassis 50. Alternatively, the rear exterior of the display apparatus 1 may be formed without an additional cover member, similar to the front chassis 40.

The printed circuit board 100 having the light sources thereon may be located at a lower portion of the rear chassis 50. The light sources may be point light sources formed in thin films to manufacture a thin screen, and include light-emitting diodes (LEDs).

In the case of a display apparatus according to the related art, light may be emitted to a display according to a direct-lit method, in which LEDs are provided in a rear region opposite to an entire surface of a display panel to directly emit light to the display panel, or an edge-lit method, in which LEDs are provided an end surface (particularly, opposite sides) of a light-guide plate to emit light to the light-guide plate so that the light may be surface-emitted by the light-guide plate.

In a direct-lit type display apparatus, because a printed circuit board for LEDs which corresponds to the entire surface of a display panel is needed, a large number of LEDs are needed. In addition, a lens diffusing light is included in each of the LEDs, and thus the printed circuit board increases in size. Furthermore, since a number of elements included in the display apparatus according to the related art may become large, and the manufacturing costs may increase. In an edge-lit type display apparatus, an additional light-guide plate is required, and thus the resulting product may be limited in shape. Furthermore, because the light-guide plate is inserted, the thickness of the display panel may increase.

To solve this problem, in the display apparatus in accordance with an aspect of an exemplary embodiment, the printed circuit board 100 having the light sources thereon may be disposed on only one side of the rear chassis 50 to reduce the number of light sources, and the first and second reflecting units 110 and 120, which are easily mountable on the rear chassis 50, are provided instead of a light-guide plate. Accordingly, light may be effectively emitted to the display panel 10.

In detail, the printed circuit board 100 may be provided at the lower portion of the rear chassis 50 and tilted toward the rear chassis 50 such that the light sources disposed on the printed circuit board 100 face the rear chassis 50. The printed circuit board 100 may have an oblong rectangular plate shape, and include an installation surface on which the light sources are arranged.

The printed circuit board 100 may be provided at a front lower side of the rear chassis 50 by a support 130 combined with the rear chassis 50 to protrude toward the front of the rear chassis 50. The support 130 may support the printed circuit board 100 as well as the second reflecting unit 120 to be described in detail below. The support 130 may be attachable to and detachable from the printed circuit board 100, but the present disclosure is not limited thereto and the support 130 may be integrally formed with the rear chassis 50.

Alternatively, the printed circuit board 100 may be supported by an element other than the support 130. The printed circuit board 100 may be directly coupled to the rear chassis 50. Alternatively, the printed circuit board 100 may be provided on the middle mold at the front lower side of the rear chassis 50.

The first reflecting unit 110 may be provided in front of the rear chassis 50 to reflect light generated from the light sources to the display panel 10. In accordance with an exemplary embodiment, the printed circuit board 100 is located only at one side (e.g., lower portion) of the display apparatus 1, and thus, without an element such as the first reflecting unit 110, light cannot be uniformly emitted to all regions of the display panel 10. Thus, because the intensity of light incident on the display panel 10 is not uniform and the brightness on the screen is not uniform, the reliability of the performance of the display apparatus 1 may be limited.

Thus, the light generated from the light sources may be reflected through the first reflecting unit 110 provided in front of the rear chassis 50. The first reflecting unit 110 may have an area corresponding to that of the display panel 10, so that the light may be emitted uniformly to all the regions of the display panel 10 without being concentrated on only one region of the display panel 10.

In accordance with an exemplary embodiment, the light emitted from the light sources may be reflected to the display panel 10 by the first reflecting unit 110 placed in front of the rear chassis 50. However, embodiments of the present disclosure are not limited thereto and the light emitted from the light sources may be directly reflected from the rear chassis 50 and emitted to the display panel 10.

That is, the rear chassis 50 may function as a reflecting unit without any additional elements. In order to increase the efficiency of light reflection, a material different from that of the rear chassis 50 may be coated on or applied to the front surface of the rear chassis 50 or a reflecting sheet or the like may be attached to the front surface of the rear chassis 50.

Figure 3:
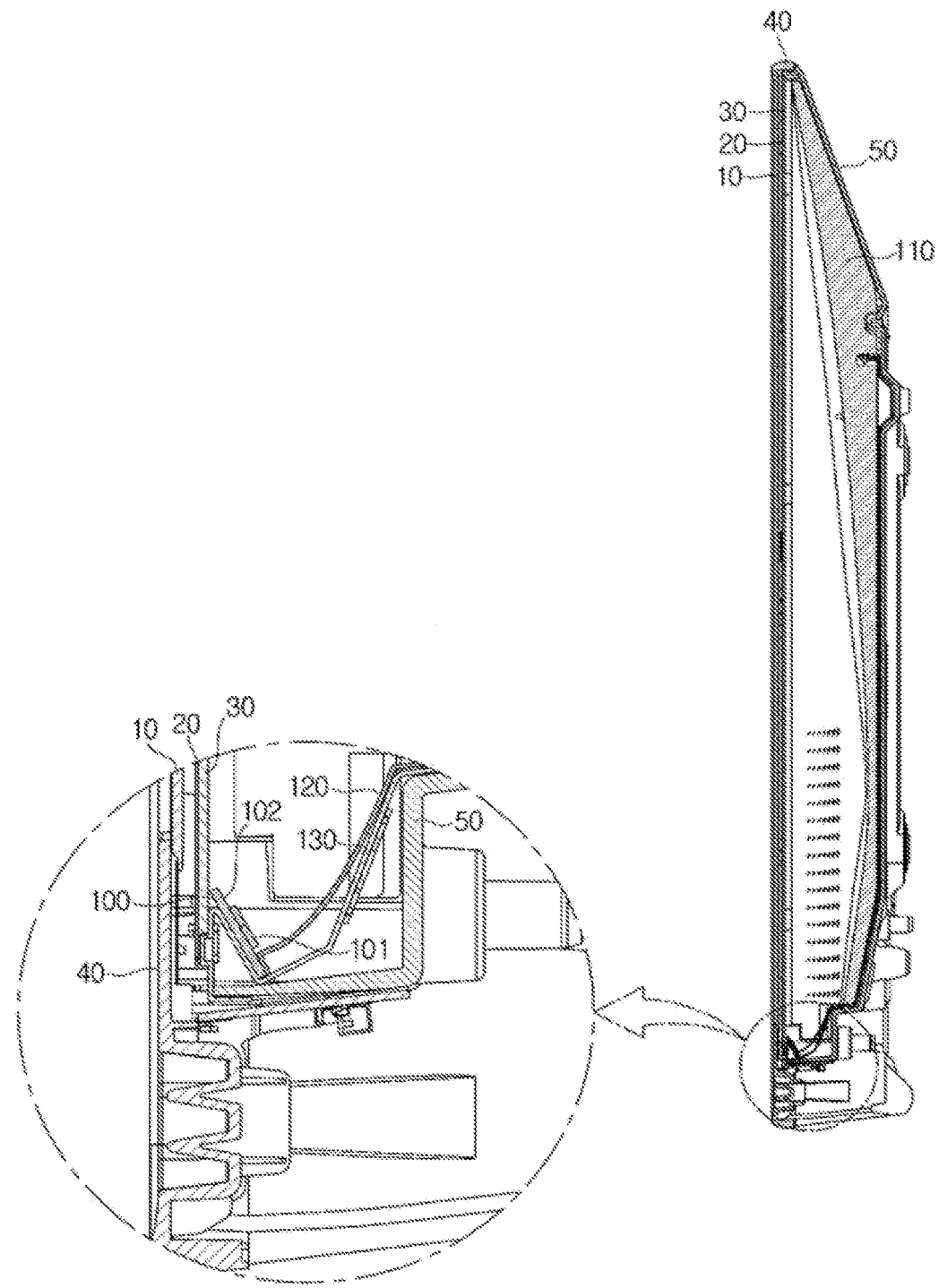
FIG. 3 is a side cross-sectional view of a display apparatus in accordance with exemplary embodiment.

FIG. 3 is a side cross-sectional view of a display apparatus in accordance with an exemplary embodiment. As shown in FIG. 3, the second reflecting unit 120 may be provided between the printed circuit board 100 and the first reflecting unit 110 so that the light generated from the light sources 101 may smoothly reach the first reflecting unit 110.

Figure 4:
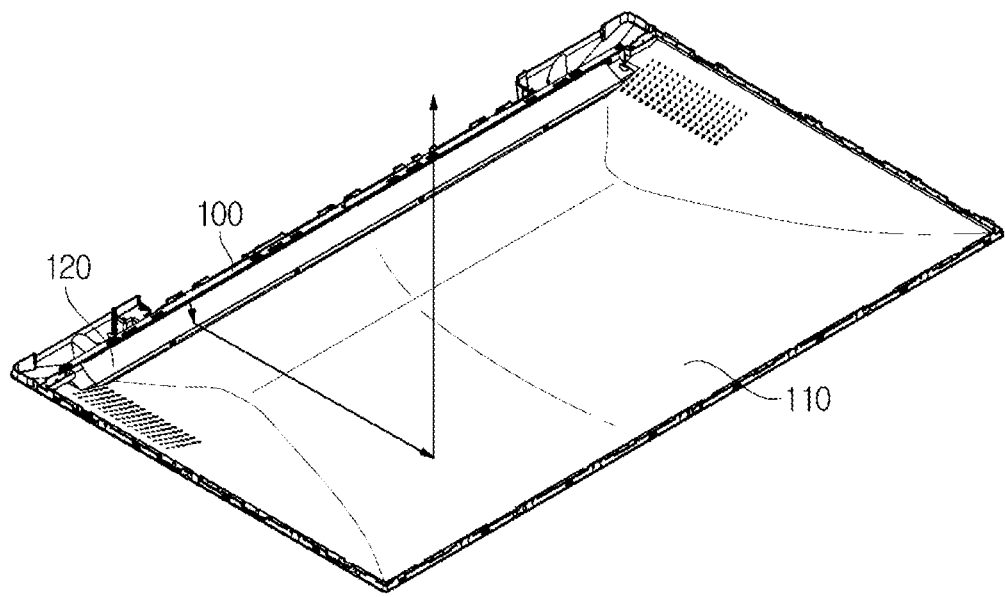
FIG. 4 is a perspective view of some elements of a display apparatus in accordance with an exemplary embodiment.

FIG. 4 is a perspective view of some elements of a display apparatus in accordance with an exemplary embodiment. As illustrated in FIG. 4, the second reflecting unit 120 may be disposed adjacent to the printed circuit board 100 to reflect at least some of the light emitted from the light sources 101 to the first reflecting unit 110.

The second reflecting unit 120 may be provided in the form of a reflector. The second reflecting unit 120 may be disposed to face the light sources 101, and include a reflecting surface 121 having a curved surface to reflect the light emitted from the light sources 101 to the first reflecting unit 110.

The reflecting surface 121 may have a curved surface which is concave toward the light sources 101, and reflect light incident thereon to the first reflecting unit 110.

The second reflecting unit 120 may be provided at the front lower side of the rear chassis 50 to correspond to the printed circuit board 100, and may be supported by the support 130, as shown in FIG. 3. The second reflecting unit 120 may be located between the printed circuit board 100 and the first reflecting unit 110 in a forward or backward direction of the display apparatus 1 so that at least some of the light emitted from the light sources 101 may be guided to the second reflecting unit 120, as will be described in detail below.

However, embodiments of the present disclosure are not limited thereto and the printed circuit board 100 may be provided on a side or top of the rear chassis 50 rather than the lower portion of the rear chassis 50. In this case, the second reflecting unit 120 may be located to correspond to a side at which the printed circuit board 100 is provided, and the reflecting surface 121 of the second reflecting unit 120 may be concave toward the light sources 101 and the first reflecting unit 110.

Alternatively, the printed circuit board 100 may be provided at a plurality of sides of the rear chassis 50. The printed circuit board 100 may be provided at a side opposite to the rear chassis 50. That is, the printed circuit board 100 may be located to be symmetric with respect to the top, the bottom, or both of the top and bottom of the rear chassis 50. In this case, a number of second reflecting units 120 corresponding to the number of the printed circuit boards 100 may be provided to reflect light emitted from the light sources 101 on each of the printed circuit boards 100 to the first reflecting unit 110.

A process of emitting light from the light sources 101 to the display panel 10 or the diffusion plate 30 via the first and second reflecting units 110 and 120 will be described in detail below. Cases in which light is emitted from the light sources 101 to the display panel 10 will be described below.

Figure 5:
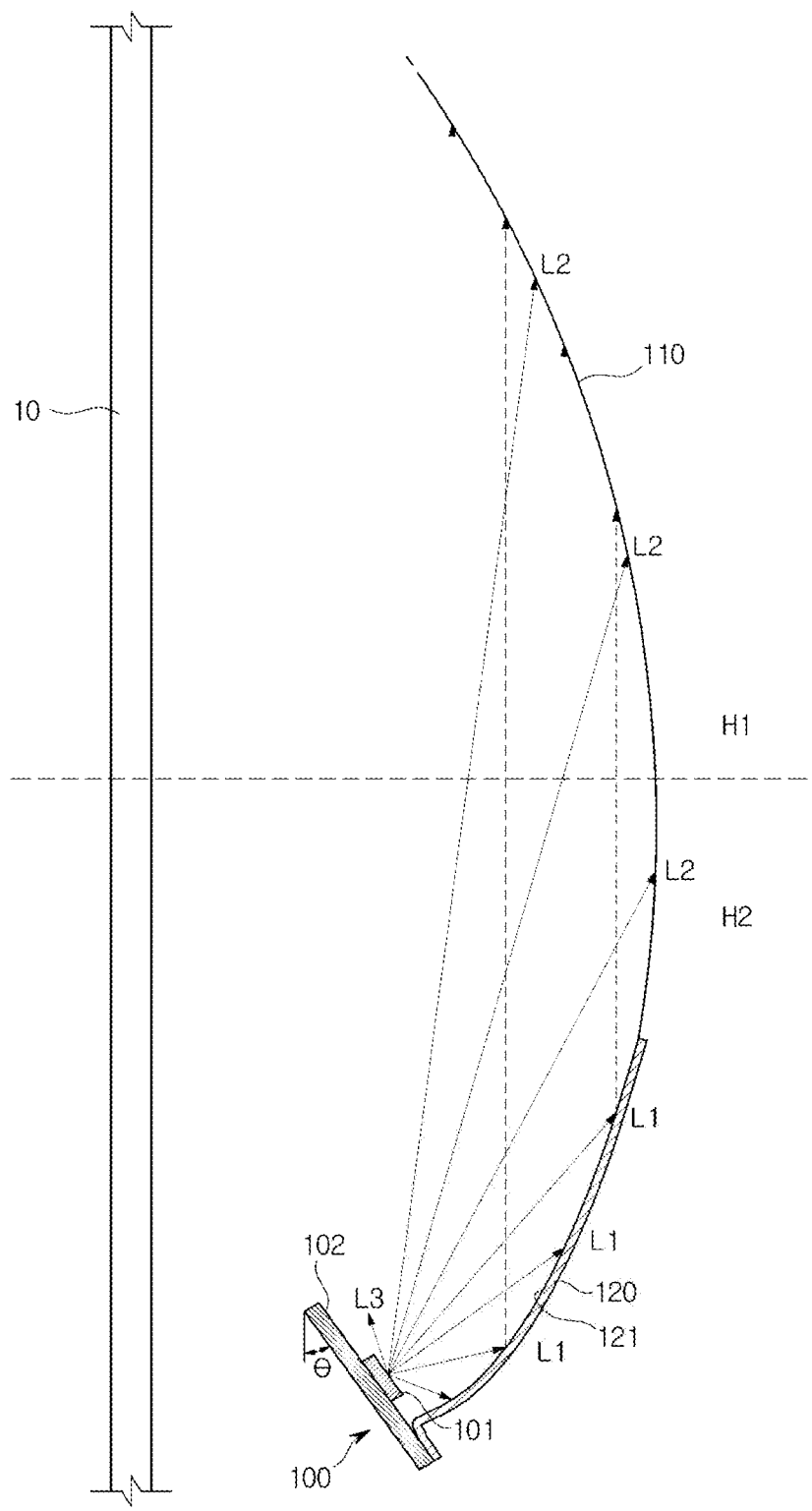
FIG. 5 is a diagram schematically illustrating paths in which light is emitted from a display apparatus in accordance with an exemplary embodiment.
Figure 6:
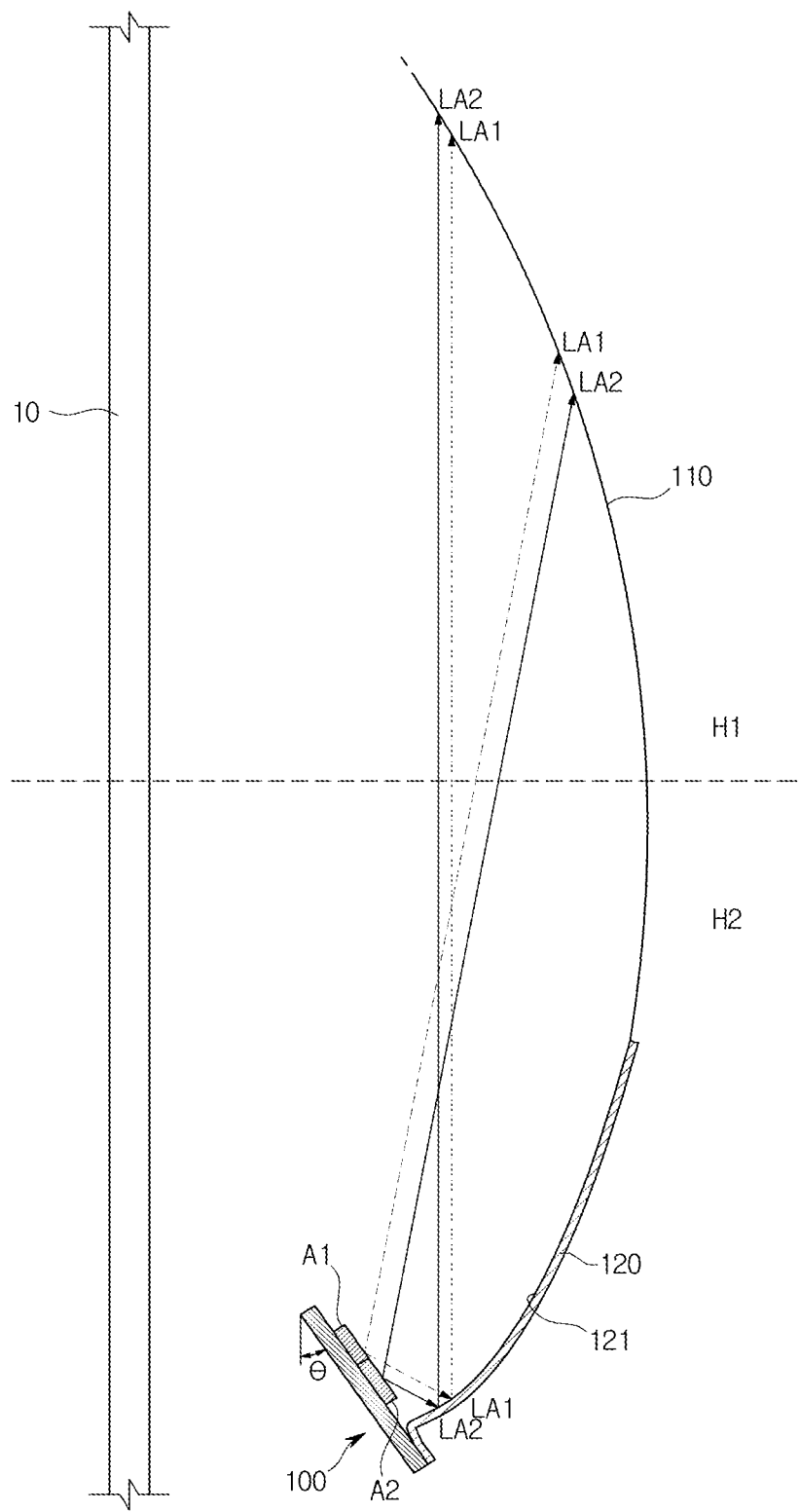
FIG. 6 is a diagram schematically illustrating paths in which light is emitted from a display apparatus having light sources arranged in two or more rows in accordance with an exemplary embodiment.
Figure 7:
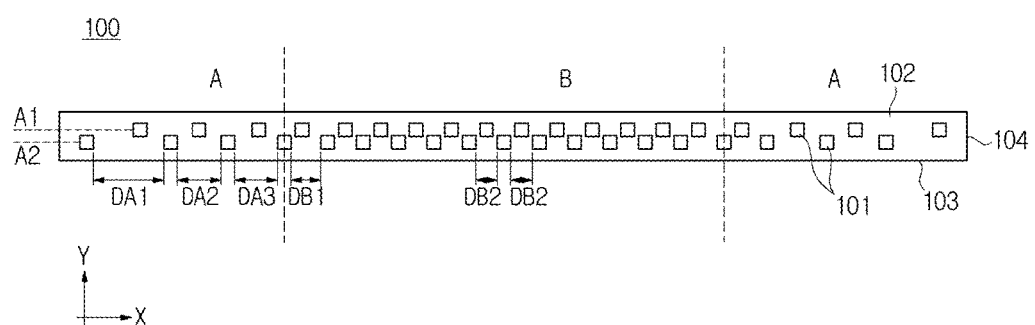
FIG. 7 is a front view of a printed circuit board of a display apparatus in accordance with an exemplary embodiment.
Figure 8:
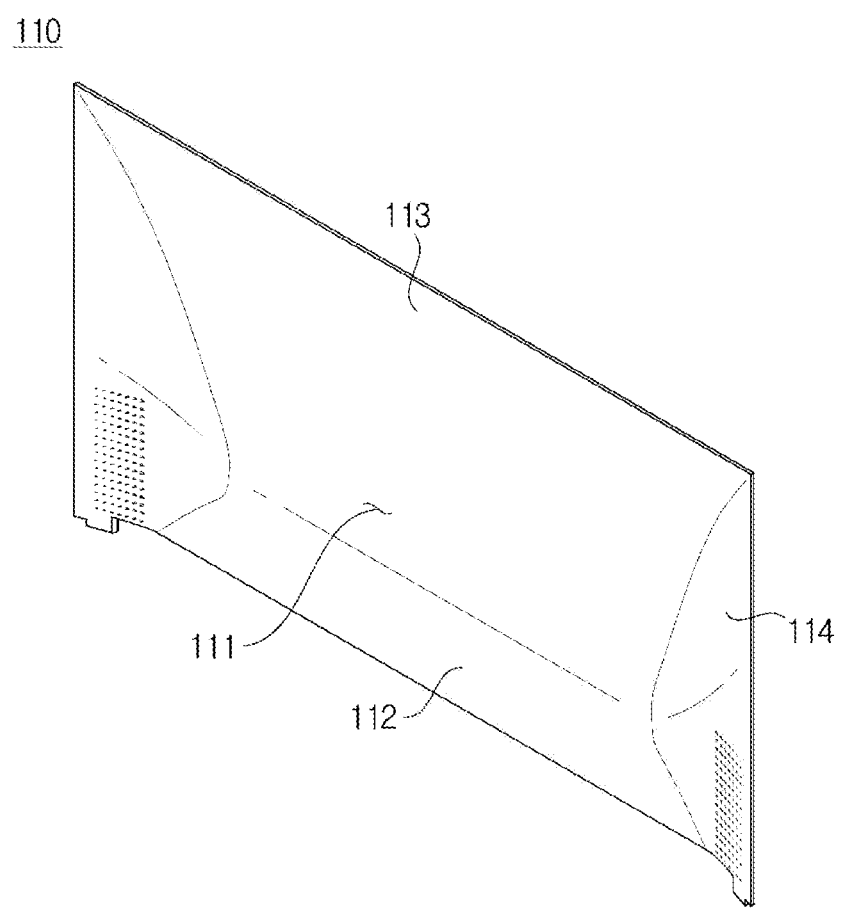
FIG. 8 is a perspective view of a reflecting unit of a display apparatus in accordance with an exemplary embodiment.

FIGS. 5 and 6 are diagrams schematically illustrating paths in which light is emitted from a display apparatus in accordance with exemplary embodiments. FIG. 7 is a front view of a printed circuit board of a display apparatus in accordance with one embodiment of the present disclosure. FIG. 8 is a perspective view of a reflecting unit of a display apparatus in accordance with an exemplary embodiment.

As further illustrated in FIG. 5, a printed circuit board 100 may be disposed such that a light source 101 faces first and second reflecting units 110 and 120. In detail, the printed circuit board 100 may be disposed such that an installation surface 102 thereof faces a rear chassis 50. Thus, the installation surface 102 from which light is emitted may face away from the display panel 10.

The printed circuit board 100 may be tilted such that light from the light source 101 may reach an upper-half portion H1 of the first reflecting unit 110. For example, an angle at which light is emitted from LEDs of the light source 101 may be about 120 degrees. This is because the amount of light reaching the upper-half portion H1 of the first reflecting unit 110 is small when the printed circuit board 100 is disposed horizontally with respect to a direction in which the first reflecting unit 110 extends.

Thus, the printed circuit board 100 may be tilted at an angle (θ) of about 30 degrees with respect to the display panel 10. However, embodiments of the present disclosure are not limited thereto and the angle may vary according to the shapes of the first and second reflecting units 110 and 120.

As described above, unlike a conventional edge-lit type or direct-lit type display apparatus, the printed circuit board 100 is disposed only at one side of the display apparatus 1 having a square exterior, and thus, without an additional element such as the second reflecting unit 120, the amount of light emitted to the other sides of the display apparatus 1 may be low.

In detail, in accordance with an exemplary embodiment, because the printed circuit board 100 is provided at a lower portion of the rear chassis 50, without the second reflecting unit 120, a relatively large amount of light may be emitted to a lower-half portion H2 of the first reflecting unit 110 which is a portion of the first reflecting unit 110 that is closer to the printed circuit board 100, but a relatively small amount of light may be emitted to the upper-half portion H1 of the first reflecting unit 110 which is another portion of the first reflecting unit 110 that is farther from the printed circuit board 100.

Accordingly, light is not uniformly emitted to the first reflecting unit 110 and thus the amount of light to be reflected and emitted to the display panel 10 is not entirely uniform.

That is, when only the first reflecting unit 110 is used, a larger amount of light may be emitted to a portion of the display panel 10 corresponding to the lower-half portion H2 of the first reflecting unit 110 than a portion of the display panel 10 corresponding to the upper-half portion H1 of the first reflecting unit 110. Thus, the brightness levels of the upper and lower halves of the display panel 10 may be different. Thus, a darker space may be formed on the upper side of the display panel 10 having low brightness.

The second reflecting unit 120 may be disposed between the light source 101 and the first reflecting unit 110 so that light concentrated on the lower-half portion H2 of the first reflecting unit 110 may be dispersed to the upper-half portion H1 of the first reflecting unit 110.

In detail, a reflecting surface 121 of the second reflecting unit 120 may have a curved surface which is concave toward the light source 101 and the first reflecting unit 110 so that light emitted from the light source 101 may be reflected to the first reflecting unit 110.

The reflecting surface 121 may include, for example, a parabolic curved surface. The light source 101 may be disposed on a focal point of a parabola of the reflecting surface 121. The first reflecting unit 110 may be disposed in a direction of an axis of the parabola of the reflecting surface 121.

When light emitted from the light source 101 reaches the reflecting surface 121, the light may be reflected in a direction parallel to the axis of the parabola from the reflecting surface 121. This is because the light source 101 is disposed at the focal point of the parabola of the reflecting surface 121 as described above.

Thus, all rays of light L1 reflected off the reflecting surface 121 may travel in parallel in one direction. The first reflecting unit 110 may be disposed in the direction of the axis of the parabola of the reflecting surface 121 and thus all the light L1 reflected off the reflecting surface 121 may reach the first reflecting unit 110.

In detail, the light L1 emitted from the light source 101 to the reflecting surface 121 may be reflected in the direction of the axis of the parabola of the reflecting surface 121, reach the upper-half portion H1 of the first reflecting unit 110, and then be directed toward the display panel 10 by the first reflecting unit 110.

When the second reflecting unit 120 is not provided, all light corresponding to the light L1 may be emitted to the lower-half portion H2 of the first reflecting unit 110. Thus, the difference between the amount of light emitted to the upper-half portion H1 of the first reflecting unit 110 and the amount of light emitted to the lower-half portion H2 of the first reflecting unit 110 may be very large. However, some of the light emitted to the lower-half portion H2 of the first reflecting unit 110 may be transmitted to the upper-half portion H1 of the first reflecting unit 110 by the second reflecting unit 120, thereby compensating for the difference between the amounts of the emitted light.

As illustrated in FIG. 5, some of light emitted from the light source 101 may be the light L1 traveling to the upper-half portion H1 of the first reflecting unit 110 via the second reflecting unit 120, and light L2 emitted above the second reflecting unit 120 may be directly reflected from the first reflecting unit 110 to the display panel 10 without traveling to the second reflecting unit 120. Some of the light L2 may reach the lower-half portion H2 of the first reflecting unit 110, and some of the light L2 may reach the upper-half portion H1 of the first reflecting unit 110.

In addition, some of the light emitted from the light source 101 (light L3) may be directly emitted to the display panel 10 without being reflected off the reflecting units 110 and 120.

The light source 101 is disposed on the lower-half portion H2 of the first reflecting unit 110 as described above. Thus, some of light reaching the lower-half portion H2 via the second reflecting unit 120 is reflected to the upper-half portion H1 so as to compensate for non-uniform light intensity caused when most of the light emitted from the light source 101 reaches the lower-half portion H2.

The reflecting surface 121 of the second reflecting unit 120 has a parabolic shape, and may thus intensively and effectively transmit light reflected by the reflecting surface 121 to the first reflecting unit 110. However, in this case, the reflected light travels only in one direction.

In this case, when the location of the light source 101 at the focal point of the parabola of the reflecting surface 121 is changed, a focal length may change, thus changing a region of the reflecting unit 110 which the reflected light reaches.

In addition, when light is directly transmitted to the first reflecting unit 110 from the light source 101, a change in the location of the light source 101 results in a change in an angle at which the light is emitted to the first reflecting unit 110. Thus, the light may be emitted to more regions of the first reflecting unit 110.

To this end, as illustrated in FIG. 7, the light sources 101 may be arranged on the printed circuit board 100 in two rows in a zigzag pattern rather than in a single row. With a conventional printed circuit board where light sources are arranged in a single line, light is emitted to only specific locations, and is thus emitted to an element, such as a display panel or a light-guide plate, at a specific angle.

As illustrated in FIG. 6, in accordance with an an exemplary embodiment, light sources 101 may be arranged on a printed circuit board 100 in two rows A1 and A2 in a zigzag pattern to increase an angle at which light is emitted to reflecting units 110 and 120.

That is, when the light sources 101 are arranged in only one of the row A1 or the row A2 as in the related art, light is emitted at a certain angle. In contrast, when the light sources 101 are arranged in the two rows A1 and A2, an angle at which light is emitted to the second reflecting unit 120 or an angle at which light is directly emitted to the first reflecting unit 110 is wider, and thus uniform light intensity may be constantly maintained. Although the light sources 101 are shown to be arranged in two rows in FIG. 6, the various embodiments are not limited in this regard. For example, the light sources 101 may be arranged in three or more rows to further widen the beam angle of the light emitted from the light sources 101.

As illustrated in FIG. 6, when a maximum angle at which light LA1 is emitted from the light sources 101 in the row A1 and a maximum angle at which light LA2 is emitted from the light sources 101 in the row A2 are about 120 degrees, the amount of the light LA1 reaching an upper-half portion H1 of the first reflecting unit 110 is greater than that of the light LA2 since the light sources 101 in the row A1 are located above the light sources 101 in the row A2 and are spaced farther apart from the first reflecting unit 50 than the light sources 101 in the row A2.

Thus, because light may be uniformly emitted to all regions of the first reflecting unit 110, the light may be reflected from a surface of the first reflecting unit 110 and be then uniformly incident on all the regions of the display panel 10.

As illustrated in FIG. 7, the printed circuit board 100 may be an oblong rectangle in shape and include long sides 103 extending in one direction, and short sides 104 which are at a right angle to the long sides 103. The long sides 103 may extend in a direction of the right and left sides of the display panel 10 (i.e., a lengthwise or horizontal direction of the display panel 10).

The light sources 101 may be arranged in the direction in which the long sides 103 extend. As described above with reference to FIG. 6, the light sources 101 may be arranged in the rows A1 and A2 in a direction different from a direction in which the short sides 104 extend.

The light sources 101 may be spaced apart from one another. When the direction in which the long sides 103 extend is an X-axis, the light sources 101 may be arranged in the rows A1 and A2 at an offset, and thus not to overlap with one another along the X-axis.

When the direction in which the short sides 104 extend is a Y-axis, the distance between the light sources 101 in the rows A1 and A2 in the direction of the Y-axis may be set such that some regions of the light sources 101 in the rows A1 and A2 overlap with one another with respect to the Y-axis. When the distance between the rows A1 and A2 is long, light can be emitted at a larger beam angle. Thus, the amount of light emitted toward the outer edges of the first and second reflecting units 110 and 120 increases and the density of the emitted light may be lower.

However, embodiments of the present disclosure are not limited thereto and the distance between the rows A1 and A2 may vary according to the areas of the display panel 10 and the first reflecting unit 110. Furthermore, the distance between the rows A1 and A2 may vary according to the distances among the printed circuit board 100 and the first and second reflecting units 110 and 120. That is, the distance between the rows A1 and A2 may vary according to the arrangement of the printed circuit board 100 and the first and second reflecting units 110 and 120 at an inner side of the display apparatus 1. In some cases, the distance between the rows A1 and A2 may be set to be longer such that the light sources 101 in the rows A1 and A2 may be spaced farther apart from each other with respect to the Y-axis.

The first reflecting unit 110 supported by the rear chassis 50 may be provided to correspond to the shape of the rear chassis 50 as illustrated in FIG. 8. The first reflecting unit 110 may have a concave shape in both horizontal and vertical directions.

The first reflecting unit 110 includes a recess 111 in a concave shape toward the display panel 10. The recess 111 may be formed in a vertically concave shape by an upper reflecting surface 113 and a lower reflecting surface 112, and may be also formed in a horizontally concave shape by lateral reflecting surfaces 114 at opposite ends of the first reflecting unit 110.

The lower, upper, and lateral reflecting surfaces 112, 113, and 114 may be tilted such that a central portion of the recess 111 is concave. In addition, the lower, upper, and lateral reflecting surfaces 112, 113, and 114 may have a curved shape, but are not limited thereto and may have a linear (i.e., flat) shape.

The first reflecting unit 110 may include an expanded polystyrene (EPS) material. The EPS material may have fine pores on a surface thereof. Thus, the fine pores are provided at the surface of the first reflecting unit 110. Light incident on the first reflecting unit 110 may be regularly or irregularly reflected to the display panel 10 through the fine pores.

In particular, Light incident on the lower, upper, and lateral reflecting surfaces 112, 113, and 114 may be irregularly reflected to the display panel 10 in various directions without being concentrated in one direction. Accordingly, the density of the light incident on the display panel 10 may be relatively uniform.

The lateral reflecting surfaces 114 are adjacent to the printed circuit board 100 (see FIG. 4) and thus the amount of the light incident on the lateral reflecting surfaces 114 may be greater than that of the light incident on the upper reflecting surface 112 and the lower reflecting surface 113.

As described above, when the amounts of the light incident on the upper, lower, and lateral reflecting surfaces 112, 113, and 114 is not uniform, it is difficult for light to be uniformly incident on all regions of the display panel 10. When the light sources 101 are arranged at uniform intervals in a direction of the long sides 103 of the printed circuit board 100, the amount of light incident on a central portion of the display panel 10 may be relatively small, and thus a dark space may be formed at the central portion of the display panel 10.

To solve this problem, as shown in FIG. 7, the number of the light sources 101 arranged in the direction of the long sides 103 may be set to vary according to a region of the printed circuit board 100 by controlling the distances between the light sources 101 to be different. That is, when a region of the printed circuit board 100 adjacent to an end of the printed circuit board 100 is defined as a first region A and a region of the printed circuit board 100 surrounding the center of the printed circuit board 100 is defined as a second region B, a distance DA between the light sources 101 in the first region A is set to be greater than a distance DB between the light sources 101 in the second region B so that the number of the light sources 101 in the first region A and the number of the light sources 101 in the second region B are different from each other. In other words, the distance between the adjoining light sources in the light sources 101 may increase towards each edge of the printed circuit board 100.

Because the distance DA is greater than the distance DB, the number of the light sources 101 in the first region A may be less than the number of the light sources 101 in the second region B.

As described above, because the first reflecting unit 110 becomes concave toward the center thereof, the distance between surfaces of the printed circuit board 100 and the first reflecting unit 110 may be greater at the first region A of the printed circuit board 110 than at the second region B thereof.

Accordingly, the distance between the light sources 101 gradually decreases toward the center of the second region B, and thus a larger number of the light sources 101 may be arranged in a central portion of the second region B.

In the first region A, a distance DA1 between the light sources 101 at an end of the printed circuit board 100 is greater than distances DA2 and DA3 between the light sources 101 near the center of the printed circuit board 100. The distance DA3 between the light sources 101 nearest to the center of the printed circuit board 100 may be shorter than the distance DA2.

In the second region B, a distance DB1 between the light sources 101 near the first region A may be greater than a distance DB2 between the light sources near the center of the printed circuit board 100.

However, the distances between the light sources 101 in accordance with an aspect of an exemplary embodiment is not limited thereto and may vary according to the shape of the first reflecting unit 110, as will be described below.

A display apparatus 1 in accordance with an aspect of another embodiment will be described below.

Figure 9:
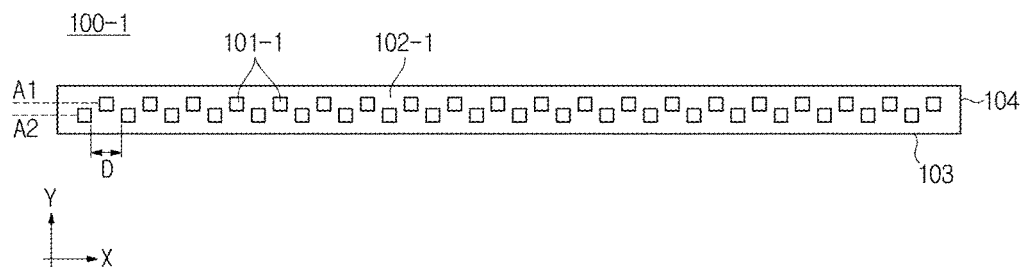
FIG. 9 is a front view of printed circuit boards of display apparatuses in accordance with an exemplary embodiment.
Figure 10:
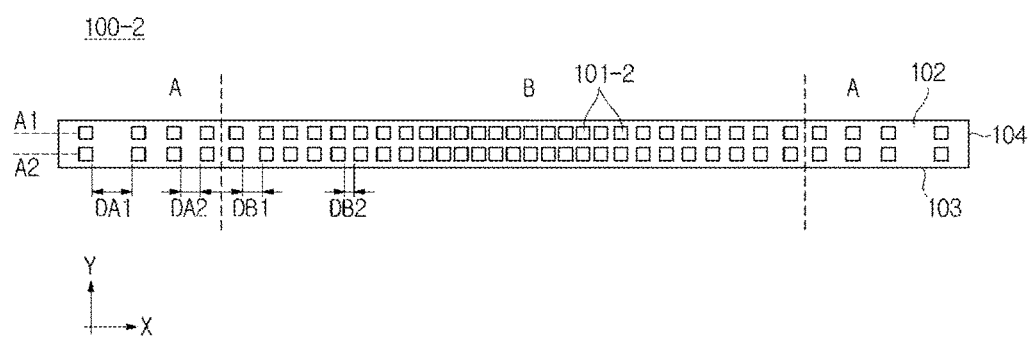
FIG. 10 is a front view of printed circuit boards of display apparatuses in accordance with an exemplary embodiment.

FIGS. 9 and 10 are front views of printed circuit boards of exemplary display apparatuses in accordance with exemplary embodiments. Elements other than the printed circuit boards 100-1 and 100-2 and the first reflecting unit 110 to be described below are substantially similar to those of the display apparatus 1 in accordance with an aspect of an exemplary embodiment as described above, and thus will not be described again.

An arrangement of light sources 101-1 on the printed circuit board 100-1 may be different according to the shape of the first reflecting unit 110, unlike the arrangement of the light sources 101 in accordance with the embodiment of the present disclosure described above.

As illustrated in FIG. 9, the light sources 101-1 may be arranged at a uniform interval D in a direction in which long sides 103 of the printed circuit board 100-1 extend (i.e., horizontal direction).

When the first reflecting unit 110 of FIG. 8 includes the upper reflecting surface 113 and the lower reflecting surface 112 without the lateral reflecting surfaces 114, unlike the embodiment of the present disclosure, the first reflecting unit 110 may have a concave shape only in a vertical direction. In this case, a certain amount of light may be uniformly distributed on the first reflecting unit 110 from the light sources 101-1 in a direction of the long sides 103 (i.e., horizontal direction) of the printed circuit board 100-1.

Thus, although the light sources 101-1 are arranged at the same interval D in the direction of the long sides 103 (i.e., horizontal direction), a uniform amount of light may reach the display panel 10 of FIG. 2 in a horizontal direction.

Alternatively, the first reflecting unit 110 may include a plurality of recesses, and some portions thereof may have a convex shape. Thus, in order to compensate for a non-uniform amount of light, the distances between the light sources 101-1 are set to be narrow so that the light sources 101—may be densely arranged in regions of the printed circuit board 100-1 corresponding to the recesses, and a relatively small number of the light sources 101-1 may be arranged in a region of the printed circuit board 100-1 corresponding to a region in which the first reflecting unit 110 is arranged closer to the printed circuit board 100-1 than the recesses.

As illustrated in FIG. 10, a distance between rows A1 and A2 may be long so that the light sources 101-2 may be arranged in the rows A1 and A2 at an offset and not to overlap with one another with respect to a Y-axis. In this case, distances between the light sources 101-2 in the rows A1 and A2 are relatively long and thus light may be emitted with a larger beam angle in a vertical direction.

Thus, even if a distance between the printed circuit board 100-2 and the first reflecting unit 110 is relatively large, light may be emitted with a large beam angle from the light sources 101-2, and thus be uniformly emitted to all regions of the first reflecting unit 110.

In addition, the light sources 101-2 may be arranged in the rows A1 and A2 to overlap with one another with respect to an X-axis. However, embodiments of the present disclosure are not limited thereto, and the light sources 101-2, or at least some thereof, may be arbitrarily arranged to overlap with one another with respect to the X-axis according to the shape of the first reflecting unit 110 corresponding thereto so that light may be uniformly distributed on all the regions of the first reflecting unit 110.

In accordance with an embodiment of the present disclosure, the display apparatus 1 is configured to emit light to the display panel 10 via the reflecting units 110 and 120 without a light-guide plate. Because the light-guide plate is not used, the display panel 10 may have a thinner profile and the manufacturing costs may decrease.

However, when the light-guide plate configured to uniformly emit light from light sources to the display panel 10 is not employed, it may be difficult to uniformly emit light to the display panel 10.

To solve this problem, the density of light to be emitted to the display panel 10 may be controlled by non-uniformly arranging the light sources 101-1 on the printed circuit board 100-1 in the vertical and horizontal directions.

Figure 11:
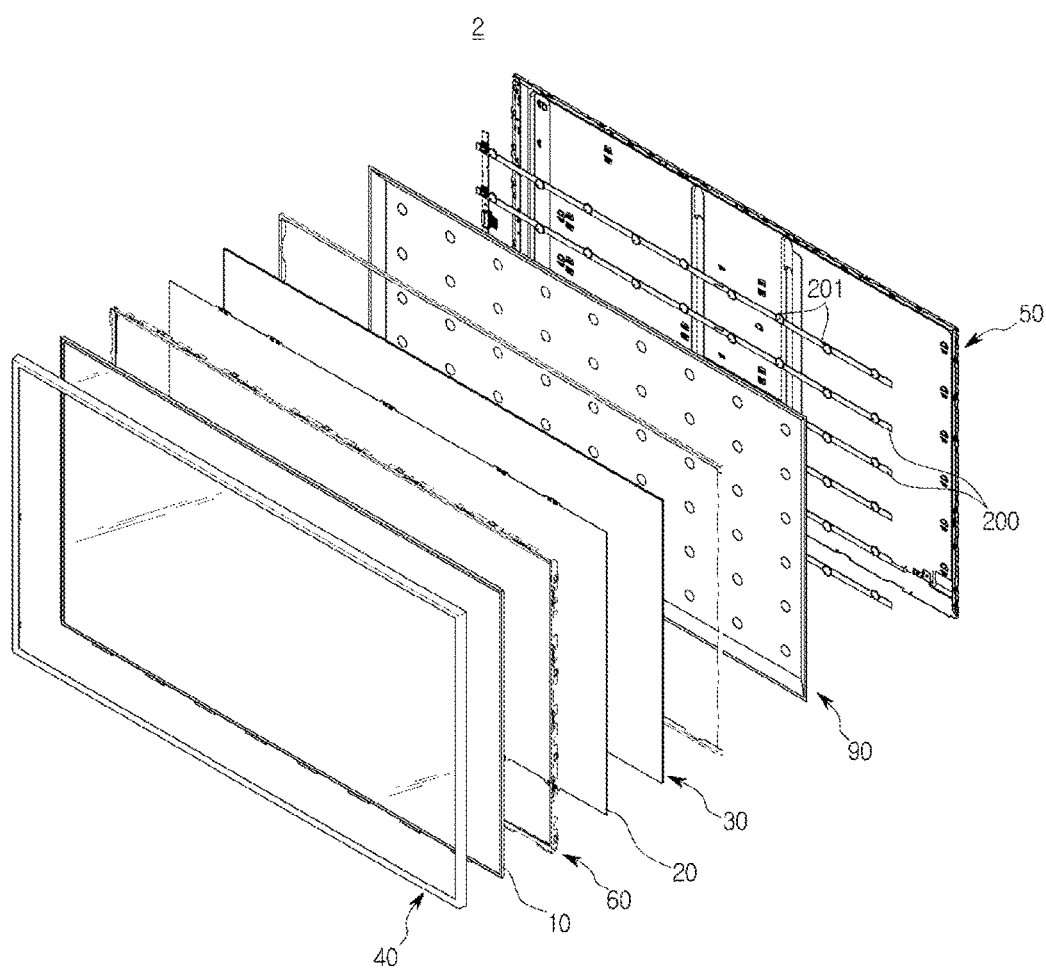
FIG. 11 is an exploded perspective view of a display apparatus in accordance with another exemplary embodiment.

FIG. 11 is an exploded perspective view of a display apparatus 2 in accordance with another exemplary embodiment 2. A structure of the display apparatus 2 is substantially similar to that of the display apparatus 1 in accordance with the embodiments described above, and thus will not be described again here.

The printed circuit board 100 described above is applicable to the display apparatus 2 similar to a direct-lit type display apparatus. As illustrated in FIG. 11, the display apparatus 2 in accordance with another embodiment of the present disclosure may include a display panel 10 which displays an image, and printed circuit boards 200 which are located behind the display panel 10 and spaced apart from one another. The printed circuit boards 200 may include light sources 201 supplying light to the display panel 10.

The display apparatus 2 may further include a middle mold 60 supporting the display panel 10, a front chassis 40 configured to maintain the display panel 10 to be supported in front of the middle mold 60, and a rear chassis 50 configured to accommodate the printed circuit boards 200 and coupled to the middle mold 13 to maintain the printed circuit boards 200 behind the middle mold 60.

A reflecting sheet 90 may be provided at an inner side of the rear chassis 50 to reflect light, which is emitted to the inner side of the rear chassis 50, to the display panel 10.

A diffusion member 30 diffusing light supplied from the light sources 201 and an optical sheet 20 improving optical characteristics of the light transmitted via the diffusion member 30 may be provided between the display panel 10 and the printed circuit boards 200.

Lenses may be provided in front of the light sources 201 to diffuse light generated by LEDs operating as the light sources 201. The lenses may diffuse the light generated by the LEDs to uniformly transmit the light to the display panel 10.

The printed circuit boards 200 may include a plurality of printed circuit boards (PCBs) each having a rectangular bar shape and disposed apart from each other in a vertical direction. Several light sources 201 are installed on each of the printed circuit boards 200 to be spaced apart from each other. Thus, the light sources 201 are vertically and horizontally spaced apart from each other behind the display panel 10.

As described above, in the display apparatus 2, which is a direct-lit type, when the amount of light reaching the display panel 10 is not uniform, a dark space may be formed on a screen. To solve this problem, the light sources 201 may be arranged on the printed circuit boards 200 in two rows in a zigzag pattern.

A distance between the two rows may vary according to the size of the display panel 10, the distance between the display panel 10 and the printed circuit boards 200, the number of the printed circuit boards 200, or the like. The distances between the light sources 201 on the printed circuit boards 200 may be not be uniform. The distances between the light sources 201 may be arbitrarily determined similar to the distance between the two rows.

Figure 12:
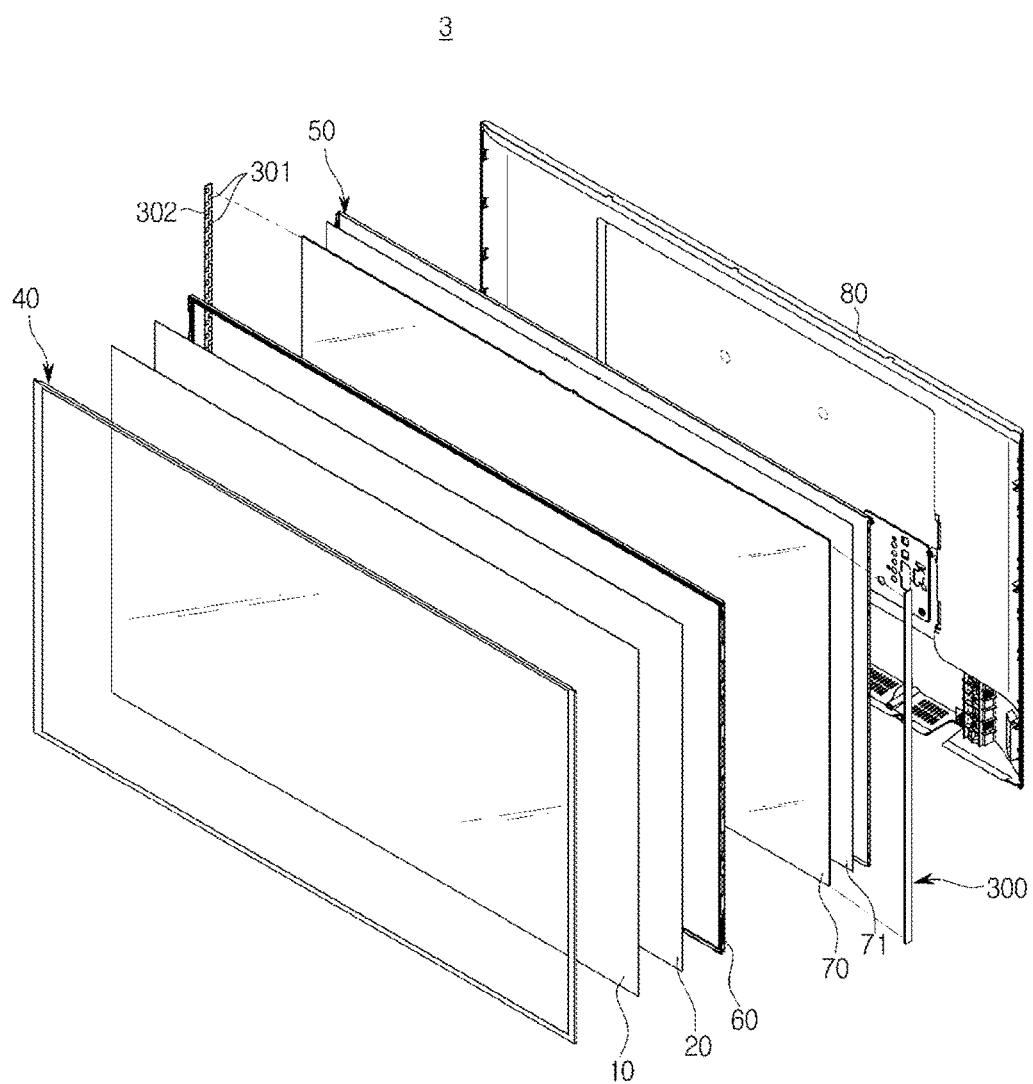
FIG. 12 is an exploded perspective view of a display apparatus in accordance with another exemplary embodiment.

FIG. 12 is an exploded perspective view of a display apparatus 3 in accordance with another embodiment. The structure of the display apparatus 3 is substantially similar to that of the display apparatus 1 in accordance with the embodiments described above, and thus will not be described again here.

The printed circuit board 100 described above is applicable to the display apparatus 3 similar to an edge-lit type display apparatus.

The display apparatus 3 may include a display panel 10, an optical sheet 20, a front chassis 40, a rear chassis 50, and a cover 80 forming a rear surface of the rear chassis 50. The display apparatus 3 may further include a light-guide plate 70 behind the display panel 10. The light-guide plate 70 includes a printed circuit board 300 having light sources 301 thereon, and guides light emitted from the light sources 301 to the display panel 10. The light-guide plate 70 converts the light emitted from the light sources 301 into surface light and guides it to the display panel 10. The light-guide plate 70 may include a reflecting sheet 71.

The light sources 301 may be provided on at least some edges of the light-guide plate 70 to emit light. The light sources 301 may be arranged along short sides or long sides of the light-guide plate 70. Locations of the light sources 301 are not limited to what is shown in FIG. 12. The light sources 301 may be disposed on at least some of the edges of the light-guide plate 70 as long as they may emit light to the light-guide plate 70. Alternatively, the light sources 301 may be disposed on at least one side of the display panel 10 in the rear chassis 50. For example, as illustrated in FIG. 12, a pair of light sources 301 may be disposed behind opposite sides of the display panel 10, but embodiments of the present disclosure are not limited thereto and the light sources 301 may be disposed at a side of the display panel 10.

A middle mold 60 may be further provided between the front chassis 40 and the rear chassis 50 in which at least some elements of the display apparatus 3 may be placed. The middle mold 60 may be provided to the optical sheet 20 and/or the display panel 10 while fixing the light-guide plate 70.

Light emitted from the light sources 301 is reflected by the reflecting sheet 71 behind the rear chassis 50 and guided to the display panel 10. That is, the reflecting sheet 71 guides the light emitted from the light source 301 to the display panel 10.

The light sources 301 may be disposed on an edge portion of the light-guide plate 70. The light sources 301 may be disposed on opposite sides of a space between the light-guide plate 70 and the rear chassis 50 (i.e., a bottom side of the rear chassis 50. Thus, the light emitted from the light sources 301 may be emitted to the rear surface of the rear chassis 50 through the space between the light-guide plate 70 and the rear surface of the rear chassis 50.

The light-guide plate 70 may be provided so that the light emitted from the light sources 301 may pass through the light-guide plate 70. The light-guide plate 70 may be formed of a transparent resin material so that the light emitted from the light sources 301 may pass through the light-guide plate 70. In addition, the light-guide plate 70 may be disposed a predetermined distance away from the light sources 301 to decrease deformation thereof due to heat generated by the light sources 301.

The light sources 301 may be disposed on the printed circuit board 300 in a zigzag pattern in a direction in which the printed circuit board 300 extends (i.e., vertical direction). In the case of the display apparatus 3 which is an edge-lit type, the density of light emitted to the display panel 10 may be uniformly distributed by the light-guide plate 70. In accordance with another embodiment of the present disclosure, the light sources 301 may be differently arranged on the printed circuit board 300 to uniformly distribute the density of light to be incident on the light-guide plate 70, thereby increasing the efficiency of the light-guide plate 70.

As is apparent from the above description, in accordance with an aspect of an exemplary embodiment, a plurality of light sources are arranged in several rows at different intervals so that light emitted from the plurality of light sources may be uniformly distributed on all regions of a display panel. Accordingly, a uniform dispersion of the light incident on the display panel may be achieved.

Furthermore, transmission of light generated by the plurality of light sources onto the display panel may be facilitated through a reflecting unit without the use of a light-guide plate or the like.

Although a few embodiments of the present disclosure have been shown and described, it should be appreciated by those skilled in the art that changes may be made in these embodiments without departing from the principles and spirit of the disclosure, the scope of which is defined in the claims and their equivalents.

What is claimed is:

1. A display apparatus comprising:
   a display panel;
   a front chassis provided in front of the display panel;
   a printed circuit board disposed behind the display panel and including a plurality of light sources arranged on the printed circuit board in a zigzag pattern;
   a rear chassis disposed behind the display panel, and including a first reflecting unit to reflect light emitted from the plurality of light sources; and
   a second reflecting unit disposed between the plurality of light sources and the first reflecting unit, and configured to reflect at least some of the light emitted from the plurality of light sources to the first reflecting unit,
   wherein the printed circuit board is tilted toward the second reflecting unit such that the plurality of light sources face the second reflecting unit.

2. The display apparatus of claim 1, wherein the plurality of light sources are arranged in a first region and a second region of the printed circuit board, wherein the first region is located at an end of the printed circuit board and the second region is located at a center of the printed circuit board, and
   wherein a first distance between first adjacent light sources of the plurality of light sources in the first region is different from a second distance between second adjacent light sources of the plurality of light sources in the second region.

3. The display apparatus of claim 2, wherein the first distance between the first adjacent light sources of the plurality of light sources in the first region is greater than the second distance between the second adjacent light sources of the plurality of light sources in the second region.

4. The display apparatus of claim 3, wherein the first distance between the first adjacent light sources of the plurality of light sources gradually decreases from the first region to the second region.

5. The display apparatus of claim 1, wherein the plurality of light sources are arranged in two rows in a lengthwise direction of the printed circuit board.

6. The display apparatus of claim 5, wherein the plurality of light sources are arranged at an offset between the two rows so as not to overlap with one another in the lengthwise direction of the printed circuit board.

7. The display apparatus of claim 1, wherein the printed circuit board comprises an installation surface on which the plurality of light sources are installed, and
   wherein the installation surface is disposed facing the rear chassis such that the plurality of light sources face the rear chassis.

8. The display apparatus of claim 7, wherein the installation surface is tilted at an angle of about 30 degrees with respect to the display panel.

9. The display apparatus of claim 1, wherein the second reflecting unit comprises a reflecting surface including a parabolic curved surface.

10. The display apparatus of claim 9, wherein the reflecting surface is concave toward the plurality of light sources.

11. The display apparatus of claim 1, wherein the printed circuit board is coupled to the rear chassis.

12. A display apparatus comprising:
a display panel;
a front chassis provided in front of the display panel;
an optical sheet disposed behind the display panel;
a diffusion plate disposed behind the optical sheet;
a printed circuit board on which a plurality of light sources configured to emit light to the display panel are installed, the printed circuit board having a long side and a short side;
a rear chassis disposed behind the diffusion plate and spaced apart from the diffusion plate to support the printed circuit board, the rear chassis comprising a first reflecting unit configured to reflect the light, emitted from the plurality of light sources, to the diffusion plate; and
a second reflecting unit disposed between the plurality of light sources and the rear chassis, the second reflecting unit being configured to reflect at least some of the light, emitted from the plurality of light sources, to the first reflecting unit,
wherein a distance between any two light sources of the plurality of light sources arranged in a first direction in which the long side extends gradually decreases toward a center of the printed circuit board, and
wherein at least some of the plurality of light sources are arranged to line up with one another in a second direction in which the short side extends.

13. The display apparatus of claim 12, wherein at least some of the light emitted from the plurality of light sources is reflected from the rear chassis to the diffusion plate.

14. The display apparatus of claim 12, wherein the first reflecting unit comprises a curved surface which is concave toward the diffusion plate.

15. The display apparatus of claim 12, wherein the second reflecting unit reflects the light emitted from the plurality of light sources in one direction.

16. The display apparatus of claim 12, wherein the second reflecting unit has a reflecting surface having a parabolic curved shape.

17. A display apparatus comprising:
a display panel;
a front chassis provided in front of the display panel;
a printed circuit board disposed behind the display panel, and including a plurality of light sources arranged in two rows in a zigzag pattern in a direction perpendicular to a lengthwise direction of the printed circuit board;
a rear chassis disposed behind the display panel, and including a first reflecting unit to reflect light emitted from the plurality of light sources; and
a second reflecting unit disposed between the plurality of light sources and the first reflecting unit, and configured to reflect at least some of the light emitted from the plurality of light sources to the first reflecting unit,
wherein a distance between the plurality of light sources is different at an end portion of the printed circuit board and at a center portion of the printed circuit board.

18. The display apparatus of claim 17, further comprising:
an optical sheet disposed behind the display panel; and
a diffusion plate disposed between the optical sheet and the rear chassis,
wherein the at least some of the light emitted from the plurality of light sources is refracted by the second reflecting unit and reflected by the first reflecting unit to reach the diffusion plate.

* * * * *